(No Model.)
D. S. TROY & J. S. DAVIS.
SEEDING MACHINE.
No. 319,432. Patented June 2, 1885.
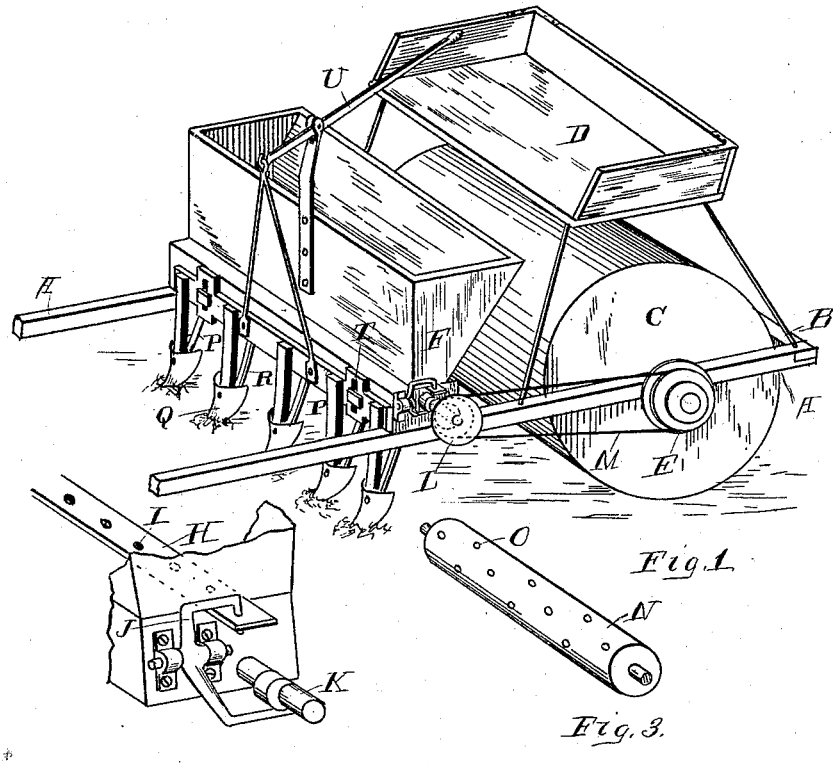
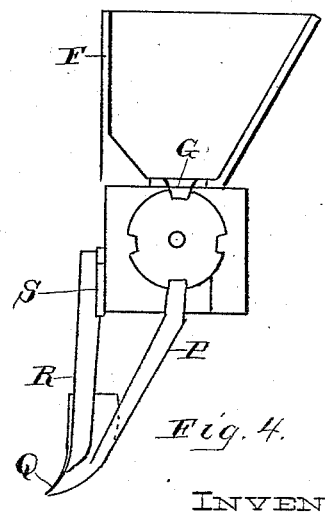
WITNESSES: Robert Kirk
INVENTOR: Daniel S. Troy, John S. Davis

UNITED STATES PATENT OFFICE.

DANIEL S. TROY AND JOHN S. DAVIS, OF MONTGOMERY, ALABAMA.

SEEDING-MACHINE.

SPECIFICATION forming part of Letters Patent No. 319,432, dated June 2, 1885.

Application filed January 2, 1885. (No model.)

*To all whom it may concern:*

Be it known that we, DANIEL S. TROY and JOHN S. DAVIS, of Montgomery, in the county of Montgomery and State of Alabama, have invented a new and useful Improvement in Seeding-Machines, which improvement is fully set forth in the following specification and accompanying drawings, in which—

Figure 1 is a perspective view of our improved seeding-machine. Fig. 2 is an enlarged perspective view of the seed-regulator; Fig. 3, a perspective view of the cylinder, and Fig. 4 a transverse sectional view of the seed-box regulator.

The present invention relates to an improvement in seeding-machines, in which the principal novelty consists in providing a revolving cylinder having therein openings disposed in spiral or quincunx order, whereby the seed or fertilizing material may be discharged from the seed-box into a series of rows at alternate intervals. The shovels connecting with the tubes through which the grain is discharged are adjustable laterally and secured to the transverse piece forward of the seed-box, and vertically adjustable by means of a lever, all of which will now be fully set forth in detail.

In the accompanying drawings, A are the side pieces, extending forward and forming a thill to receive the animal to move the device. Rearwardly a transverse piece, B, is provided, and immediately forward a roller, C, of suitable size is journaled transversely. Over this roller a seat, D, is provided, having a suitable bearing upon the frame A. The journal at one end of the roller extends outwardly from the frame, and has secured thereon a pulley, E.

Forward of the roller C we provide a seed-box, F, the upper part of ordinary construction, the lower part provided with a series of openings, G, therein. A sliding plate, H, placed over the bottom of this hopper, is provided with a series of openings, I, corresponding with the number of openings within the bottom. One end of this plate H extends outwardly through the end of the hopper, and has a lever, J, connecting therewith, the lower part of which is connected with a cam upon the shaft K, by means of which the said plate H is moved back and forth laterally. The shaft K has on its outer end a pulley, L, connected by means of a belt, M, with the pulley E, and has inwardly, immediately beneath the openings G in the bottom of the hopper, a cylinder, N, of any suitable size, provided on its periphery with a series of openings, O, at suitable distances apart, laterally, corresponding with the openings in the bottom of the hopper. These openings O are disposed around the cylinder in quincunx or spiral form, so that the seed will be discharged from the hopper through the openings alternately.

Immediately below the opening in the hopper we provide a series of tubes, P, in general use in connection with this class of machines, and immediately forward a series of shovels, Q, secured to vertical shanks R, which are fixed at their upper ends to the transverse piece S, which slides in ways T, and is adjustable vertically by means of a lever, U, extending rearwardly toward the driver's seat.

When the cylinder or rod N, having therein the openings, is revolved, the seed is discharged through the tubes beneath in quantities regulated by means of the sliding plate H.

The distance apart of the rows may be regulated by adjusting the shovels and tubes as found desirable.

By means of the lever U the shovels Q may be adjusted vertically at any desired height for any kind of ground.

The roller may be of any suitable weight, so as to crush the clods in passing.

What we claim is—

1. In a seeding-machine having a crushing-cylinder, a driver's seat, a hopper, seed drills, and tubes, the combination of the spirally-perforated seed-discharging cylinder N, rotated by pulleys and a belt, as described, a perforated seed-slide in the bottom of the hopper, a cam, K, on the shaft of cylinder N, and the angular lever J, substantially as described.

2. The combination, in a seeding-machine, of the shovel-shanks R, the transverse piece S, sliding in ways T and adjustable vertically by a hand-lever, and the hopper provided with a spirally-perforated cylinder and a seed-slide, adjustable as described.

In testimony that we claim the foregoing we have hereunto set our hands this 10th day of October, 1884, in the presence of witnesses.

DANIEL S. TROY.
JOHN S. DAVIS.

Witnesses:
HENRY C. TOMPKINS,
JAMES JACKSON.